April 30, 1929.  G. F. WIKLE  1,711,074
TIRE BUILDING MACHINE
Filed April 20, 1927    2 Sheets-Sheet 1
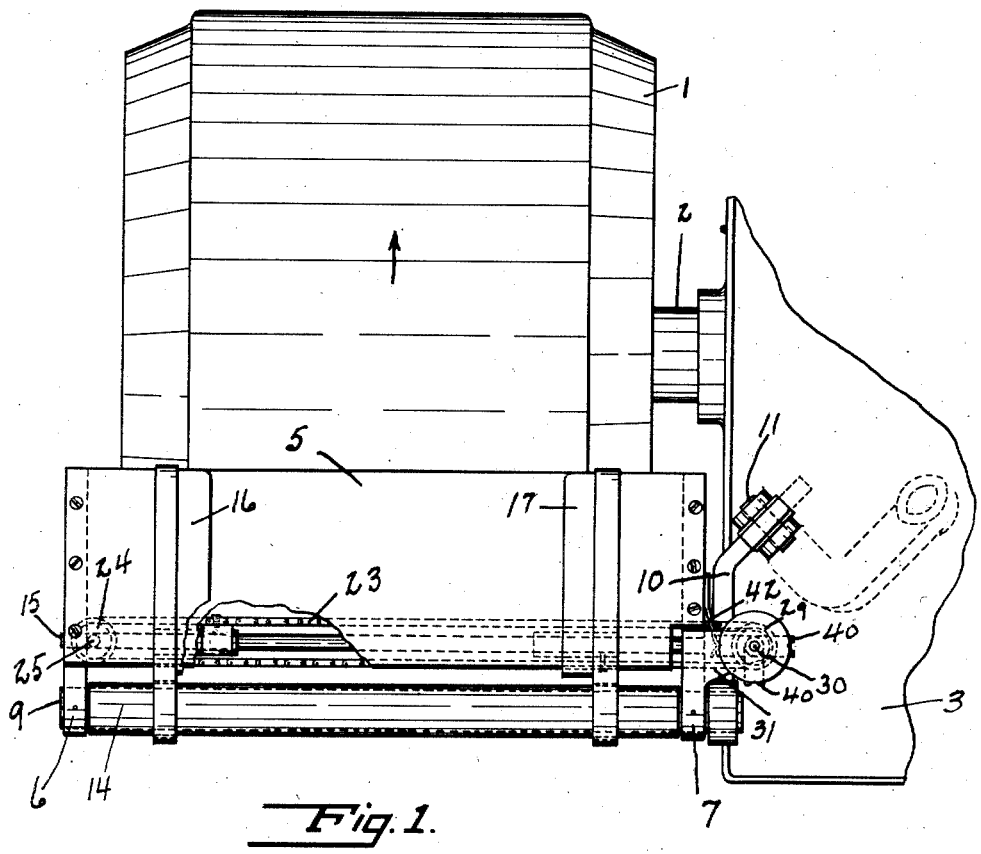

April 30, 1929.  G. F. WIKLE  1,711,074
TIRE BUILDING MACHINE
Filed April 20, 1927  2 Sheets-Sheet 2

George F. Wikle
INVENTOR.

BY Robert M. Harvey
ATTORNEY.

Patented Apr. 30, 1929.

1,711,074

UNITED STATES PATENT OFFICE.

GEORGE F. WIKLE, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

TIRE-BUILDING MACHINE.

Application filed April 20, 1927. Serial No. 185,161.

My invention relates to machines for building pneumatic tire casings on substantially flat drums or formers and more particularly to a device for guiding plies of carcass material, of varying width, and the tread rubber onto the drum or former.

It is among the objects of my invention to provide a device of the above character adapted to be quickly and accurately adjusted to guide varying widths of material onto the drum and to permit tensioning of the material as it is drawn onto the drum if desirable. Other and further objects will be apparent from the following specification and claims.

In the accompanying drawings which illustrate one embodiment of my invention.

Figure 3:
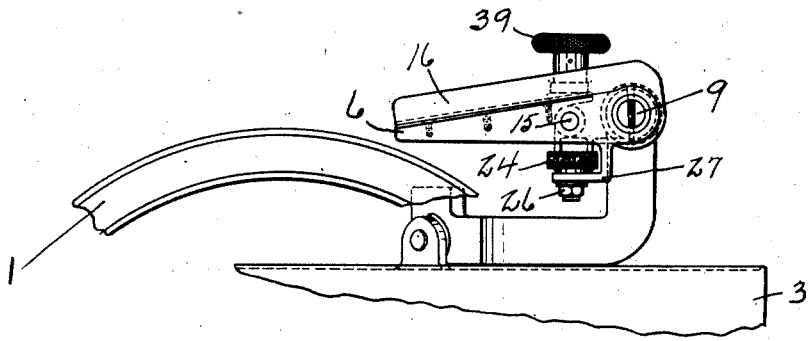
Figure 4:
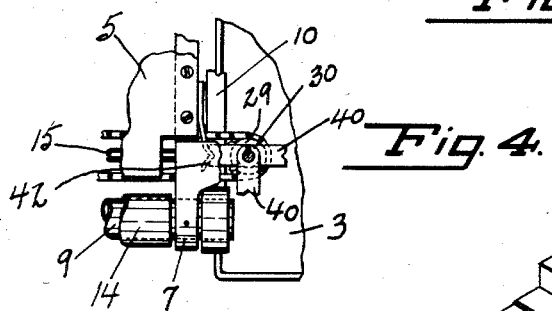
Figure 5:
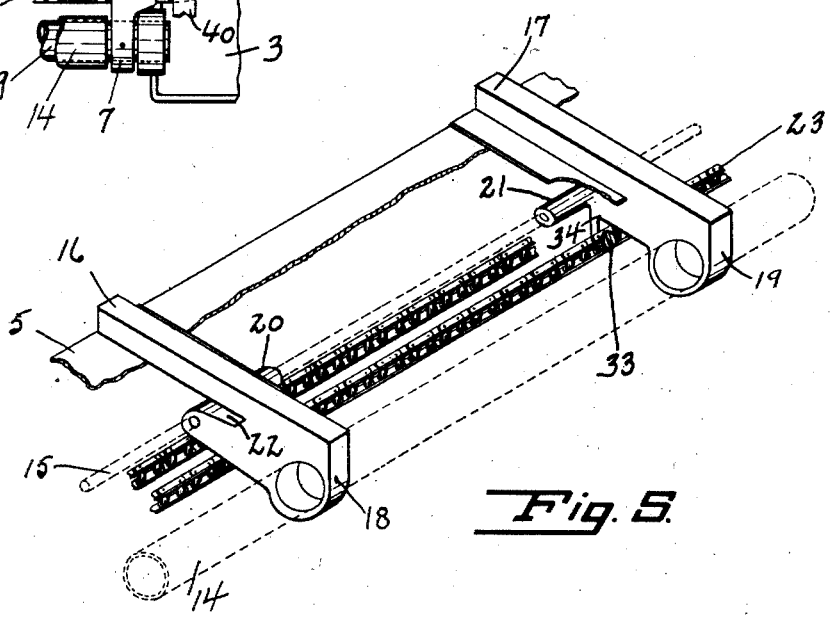
Figure 6:
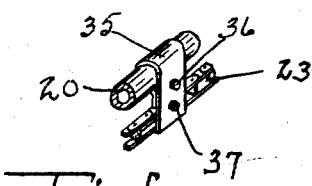

Figure 1 is a plan view of the device in operative relation with the drum, parts being broken away, Figure 2 is a front elevation of the device, Figure 3 is a side elevation of the device, Figure 4 is a detail of the parts controlling the setting of the guides, Figure 5 is a fragmentary perspective view showing the operation, Figure 6 is a detail perspective view showing the manner of adjustably connecting one of the guides to the chain.

Referring to the drawing 1 designates the collapsible tire building drum or support upon which the tire is built, which is secured to a shaft 2 and adapted to be rotated, in the direction of the arrow in Figure 1, by a motor, or other source of power, enclosed in housing 3 of the tire building machine. In the building operation one end of a strip of carcass material is stuck to the drum and the latter rotated to draw the strip about the drum. Successive plies of different width, and the tread strips are similarly placed on the drum. It is essential that all parts of the tire shall be accurately positioned with respect to the drum and each other. My guide for accomplishing this comprises a plate 5 secured to arms 6 and 7 secured to a shaft 9 rigidly held in a bracket 10 pivoted at 11 to housing 3. Bracket 10 is adapted to be swung, together with its supported parts, to the dotted line position, indicated in Figure 1. Bracket 10 is provided with a lug 12 to limit its backward swing.

Shaft 9 is provided intermediate arms 6 and 7 with an antifriction sleeve or roller 14, which together with a rod 15, secured in arms 6 and 7, serve to guide and support guide members 16 and 17, for transverse sliding movement across plate 5. As is best shown in Figures 1 and 2 guides 16 and 17 are formed, respectively, with bearings 18 and 19 slidably engaging roll 14 and bearings 20 and 21 sliding on rod 15. Guides 16 and 17 are cut away as at 22 to receive the rear edge of plate 5.

Guides 16 and 17 are adapted to be simultaneously moved toward and from each other by means of a sprocket chain 23, passing around a sprocket 24 carried by a stub shaft 25 adjustably secured at 26 in a depending bracket 27 formed integral with, or secured to, arm 6, and a sprocket 29 secured to a shaft 30 mounted in bearings 31 and 32 formed integral with, or secured to arm 7. Guide 17 is secured directly to the rear run of chain 23 by a bolt or machine screw 33 passing through a link of the chain, and threaded into a lug 34 depending from the guide, as best shown in Figures 2 and 5. In order to permit a more exact initial setting and centering of the guides, guide 16 is secured to the forward run of chain 23 by means of a clamp 35 encircling bearing 20 of guide 16 and adapted to be tightened in adjusted position thereon by means of a bolt 36, the lower end of the clamp being secured to the forward run of chain 23 by a bolt or machine screw 37.

Chain 23 is driven, to simultaneously move guides 16 and 17 toward and from each other, by means of a knurled hand wheel 39 secured to shaft 30. I provide means for positioning guides 16 and 17 in one or more predetermined positions, and in the form illustrated three such positions are shown, one for the first two plies of carcass material, one for the third and fourth plies and one for the tread. As shown the positioning means takes the form of detent fingers 40, one for each position, adjustably secured as by set screws 41 to shaft 30 intermediate bearings 31 and 32. Fingers 40 are notched on their free ends, as shown to receive spring detent 42 secured to arm 7. Fingers 40 being substantially longer than the radius of sprocket 29 a large angular adjustment of fingers 40 with respect to shaft 30 results in a relatively small change in the position of guides 16 and 17.

In operation shaft 9 is swung to the position shown in Figures 1 and 3, guides 16 and 17 moved into position for the first two plies of carcass material by bringing the proper finger 40 into locking relation with detent 42. Drum 1 is set in rotation in the direction of the arrow in Figure 1 and the first two plies of carcass material fed onto the drum. Guides 16 and 17 are then repositioned for the third and fourth plies by moving the appropriate finger 40 into locking relation with detent 42, and finally the guides are similarly reset for the tread.

When, as is sometimes necessary, particularly with the tread, it is desired to stretch the strip as it is applied the operator applies the necessary tension by bending the strip downwardly around roller 14 and pulling back on the strip as it is drawn forward by the drum 1.

I claim:

1. A device of the character described, comprising, a plate adapted to be positioned in operative relation with a tire building drum, a pair of guide members transversely movable over the plate, means to simultaneously move the guide members toward and from each other and means to selectively locate the latter in a plurality of predetermined positions.

2. A device of the character described, comprising, a plate adapted to be positioned in operative relation with a tire building drum, a pair of guide members transversely movable over the plate, means to simultaneously move the guide members toward and from each other, means to selectively locate the latter in a plurality of predetermined positions, and an anti-friction roll across the rear edge of the plate.

3. A device of the character described, comprising a plate adapted to be positioned in operative relation with a tire building drum, a pair of guide members transversely movable over the plate, means to simultaneously move the guide members toward and from each other and means adjustably associated with the last named means to selectively locate the guide members in a plurality of predetermined positions.

4. A device of the character described, comprising, a plate adapted to be positioned in operative relation with a tire building drum, a pair of guide members transversely movable over the plate and extending around the rear edge of the plate and beneath the latter, and means positioned beneath the plate to simultaneously move the guide members toward and from each other.

5. A device of the character described, comprising, a plate adapted to be positioned in operative relation with a tire building drum, a pair of guide members transversely movable over the plate and extending around the rear edge of the plate and beneath the latter, means positioned beneath the plate to simultaneously move the guide members toward and from each other and means associated with the last named means to releasably lock the guide members in a plurality of predetermined positions.

6. A device of the character described, comprising, a plate adapted to be positioned in operative relation with a tire building drum, a pair of guide members transversely movable over the plate, a sprocket chain, means connecting one of the guide members to one run of the chain and means connecting the other guide member to the other run of the chain.

7. A device of the character described, comprising a plate adapted to be positioned in operative relation with a tire building drum, a pair of guide members transversely movable over the plate, a sprocket chain, means connecting one of the guide members to one run of the chain, means connecting the other guide member to the other run of the chain, and an anti-friction roll across the rear edge of the plate.

8. A device of the character described, comprising, a plate adapted to be positioned in operative relation with a tire building drum, a pair of guide members transversely movable over the plate, an idle sprocket and a driven sprocket, a sprocket chain passing around said sprockets, means connecting one of the guide members to one run of the chain, means connecting the other guide member to the other run of the chain, and a plurality of detents adjustably secured to the shaft of the driven sprocket adapted to locate the guide members in predetermined positions on the plate.

9. A device of the character described, comprising, a plate adapted to be positioned in operative relation with a tire building drum, a pair of guide members transversely movable over the face of the plate and extending around the rear edge of the plate and beneath the latter, an idle sprocket and a driven sprocket positioned below the plate, a sprocket chain passing around said sprockets, means connecting one of the guide members to one run of the chain, means connecting the other guide member to the other run of the chain at least one of said connections being adjustable, and a plurality of detents adjustably secured to the shaft of the driven sprocket adapted to locate the guide members in predetermined positions on the plate.

In testimony whereof I have signed my name to the above specification.

GEORGE F. WIKLE.